United States Patent Office 3,105,834
Patented Oct. 1, 1963

3,105,834
2-(5-NITRO-2-FURYL)-IMIDAZO [1,2-a]-
PYRIDINE OR -PYRIMIDINE
Peter H. L. Wei, Upper Darby, Pa., assignor to The
Norwich Pharmacal Company, a corporation of New
York
No Drawing. Filed Oct. 11, 1961, Ser. No. 144,305
3 Claims. (Cl. 260—256.4)

This invention relates to chemical compounds having the formula:

wherein X represents nitrogen or formylene. These compounds are high melting, lowly water soluble crystalline solids. They are parasiticides and are particularly inimical to bacteria and protozoa. They can readily be combined with suitable carriers for convenient administration to combat and prevent the growth of parasites. In combination with suitable pharmaceutical carriers they exert systemic antimicrobial action upon oral administration. Thus, mice lethally infected with *Salmonella typhosa* are protected by administering to them from about 50 to 250 mg./kg. of these new compounds. Further, chickens and turkeys infected by *Histomonas meleagridis* are successfully treated through the administration to them of a diet containing from about 0.011% to about 0.022% by weight of these compounds.

The compounds are readily prepared by the reaction of a halomethyl 5-nitro-2-furyl ketone and the appropriate aminoheterocycle:

wherein X has the significance given above. The reaction is preferably carried out in the presence of an inert solvent such as dimethylformamide or alcohol employing equimolar amounts of the reactants. The reaction takes place smoothly at ambient or slightly elevated temperature and the end product is readily recovered in conventional fashion.

In carrying out the reaction, the halomethyl 5-nitro-2-furyl ketone, preferably bromomethyl 5-nitro-2-furyl ketone, is dissolved in an inert solvent such as dimethylformadide or alcohol and added to the aminoheterocycle dissolved or suspended in a similar solvent. It is desirable to agitate the mixture to secure good contact of reactants. The reaction is readily conducted at ambient temperature or if it is desired to facilitate it, heat may be supplied. After the reaction is completed, indicated by the appearance of crystals; the mixture is filtered. Prior to filtering, the solution may be treated with a clarifying agent such as charcoal and the end product recovered from the filtrate by chilling and filtration. The product may be purified by recrystallizing from suitable solvents such as dimethylformamide or nitromethane.

In order that this invention may be readily available to and understood by those skilled in the art, the following illustrative examples are appended.

EXAMPLE I 2-(5-Nitro-2-Furyl)Imidazo [1,2-a] Pyridine

To a solution of 66 g. of 2-aminopyridine in 300 cc. of ethanol is added a solution of 82 g. of bromomethyl 5-nitro-2-furyl ketone in 70 cc. dimethylformamide. The dark solution is warmed on a hot plate until solids appear. Upon cooling the yellow solids are collected and washed with ethanol and ether. There are obtained 51 g. (63.8% yield) of 2-(5-nitro-2-furyl)imidazo [1,2-a] pyridine. This may be recrystallized from nitromethane to give the product (M.P. 252–254° C.).

Analysis for $C_{11}H_7N_3O_3$: Calc. C, 57.64; H, 3.08; N, 18.34. Found: C, 57.60, 57.62; H, 3.48, 3.40; N, 18.49, 18.61.

EXAMPLE II 2-(5-Nitro-2-Furyl)Imidazo [1,2-a] Pyrimidine

A solution of 70 g. of bromomethyl 5-nitro-2-furyl ketone in 100 cc. of dimethylformamide is added to a suspension of 60 g. of 2-amino-pyrimidine in 250 cc. of dimethylformamide. The dark solution is treated with chacoal and filtered. The filtrate is heated on a hot plate for 10 minutes. Upon cooling the brown solids are collected. Recrystallization from dimethylformamide gives 42 g. of yellow crystalline 2-(5-nitro-2-furyl)imidazo [1,2-a] pyrimidine (yield 61%), decomposing above 300° C.

Analysis for $C_{10}H_6N_4O_3$: Calc. C, 52.18; H, 2.63; N, 24.34. Found: C, 51.97, 51.84; H, 2.72, 2.61; N, 24.45, 24.56.

What is claimed is:
1. A chemical compound of the formula:

wherein X is a member of the group consisting of nitrogen and formylene.

2. The chemical compound 2-(5-nitro-2-furyl)imidazo [1,2-a] pyridine having the formula:

3. The chemical compound 2-(5-nitro-2-furyl)imidazo [1,2-a] pyrimidine having the formula:

References Cited in the file of this patent

Matsukawa et al.: Chem. Abstracts, vol. 46, pp. 8094–5 (1952); vol. 47, pp. 6410–6411 (1953).

Gilman et al.: J. Am. Chem. Soc., vol. 47, pp. 245–54 (1925).

Burger: Medicinal Chemistry, 3rd ed. (New York, 1960), pp. 79–81.

Williams: Detoxication Mechanisms (New York, 1947), pp. 194–7 (Equivalency Digest).

Alles et al.: J. Pharm. Exptl. Therap., vol. 72, pp. 265–75 (Equivalency Digest).